United States Patent [19]

Ikedo et al.

[11] Patent Number: 4,794,580
[45] Date of Patent: Dec. 27, 1988

[54] PICKUP SYSTEM IN OPTICAL INFORMATION RECORDING AND REPRODUCING APPARATUS WITH DAMPED LEAD WIRES

[75] Inventors: Yuji Ikedo; Tsutomu Miyakawa, both of Tokyo; Takahiro Okajima; Masahiko Miyake, both of Saitama, all of Japan

[73] Assignee: Pioneer Electronic Corporation, Tokyo, Japan

[21] Appl. No.: 900,207

[22] Filed: Aug. 25, 1986

[30] Foreign Application Priority Data

| Jul. 12, 1985 | [JP] | Japan | 60-153651 |
| Jul. 12, 1985 | [JP] | Japan | 60-153652 |
| Jul. 12, 1985 | [JP] | Japan | 60-153653 |
| Jul. 12, 1985 | [JP] | Japan | 60-153654 |
| Jul. 12, 1985 | [JP] | Japan | 60-153655 |
| Jul. 12, 1985 | [JP] | Japan | 60-153656 |
| Aug. 23, 1985 | [JP] | Japan | 60-128601[U] |

[51] Int. Cl.$^4$ .............................................. G11B 7/95
[52] U.S. Cl. ........................................ 369/44; 369/45; 350/252
[58] Field of Search ............... 369/44, 111, 45, 215, 369/219, 220, 221, 247; 350/252, 255

[56] References Cited

U.S. PATENT DOCUMENTS

| 4,135,206 | 1/1979 | Kleuters | 369/45 |
| 4,321,701 | 3/1982 | Arquie | 369/45 |
| 4,367,543 | 1/1983 | Araki | 369/45 |
| 4,482,986 | 11/1984 | Noda | 369/45 |
| 4,488,789 | 12/1984 | Kenny | 369/44 |

Primary Examiner—Alan Faber
Attorney, Agent, or Firm—Sughrue, Mion, Zinn, Macpeak, and Seas

[57] ABSTRACT

An optical pickup system in which a tracking objective lens is moved by opposed magnetic coils attached to the lens along the axis of the lens and in the transverse direction across the recording tracks. A servo system on a fixed base supplies current to the movable coils by lead wires which are connected at the middle to a fixed vibration absorbing material, such as polyurethane foam.

3 Claims, 6 Drawing Sheets

PICKUP SYSTEM IN OPTICAL INFORMATION RECORDING AND REPRODUCING APPARATUS WITH DAMPED LEAD WIRES

BACKGROUND OF THE INVENTION

1. Field of the Invention

The present invention relates to a pickup system in an optical information recording and reproducing apparatus.

2. Background Art

Generally, a disk which is used as an information recording medium, such as a video disk, a digital audio disk, or the like, is recorded with information signals by means of the formation of fine pits or grooves in spiral tracks on its surface corresponding to the information signals. In the case where the thus recorded information signals are read, the disk is rotated and the tracks are irradiated with a fine spotlight so that the changes of reflected light owing to the presence or absence of the pits are converted into electric signals to thereby reproduce the original information signals from the electric signals.

This reproduction requires that the spotlight be exactly focused on the recording surface of the disk. Accordingly, it is necessary to perform position control by a focusing servo system for an objective lens, which is moved in the direction of the optical axis of the objective lens in order to focus the spotlight on the recording surface. Furthermore, this reproduction requires that the spotlight exactly track the recording tracks. Accordingly, it is necessary to perform additional position control (by a tracking servo system) which moves the spotlight in the direction of the radius of the disk.

Figure 10:
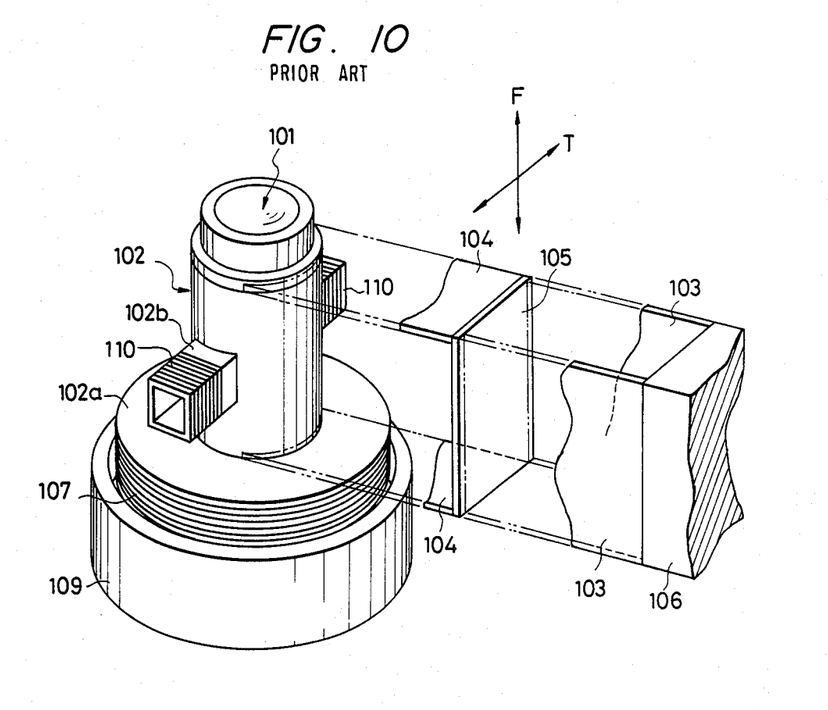
FIG. 10 is a view for explaining a pickup system which has been already developed.

For the purpose of performing such position control for the objective lens, a pickup system as shown in FIG. 10 has been conventionally developed.

Referring to FIG. 10, an objective lens 101 is mounted onto the upper end of a cylindrical lens holder 102. The lens holder 102 is mounted onto a base member 106 through two pairs of leaf springs 103 and 104 (that is, four leaf springs) which are unidirectionally flexible in respective directions. A junction member 105 is interposed between the pairs of springs 103 and 104. The lens holder 102, the leaf springs 103 and 104, the junction member 105, the base member 106, and so on make up a supporting mechanism which is arranged to support the objective lens 101 and which enable the objective lens to be moved in the direction of the optical axis of the objective lens (that is, in the direction of the arrow F) and in the direction perpendicular thereto (that is, in the direction of the arrow T). They also align the optical axis of the objective lens 102 to be perpendicular to the recording surface of the disk which is a recording medium.

The lower end of the lens holder 102 forms a round bobbin 102a on which a focusing coil 107 is wound. The round bobbin 102a including the focusing coil 107 is inserted into a cylindrical magnetic circuit 109. A pair of square bobbins 102b extending mutually opposed in the direction of the arrow T are provided at the outer circumference of the lens holder 102 and are integral with the body of the lens holder 102. A tracking coil 110 is wound on each of the square bobbins 102b. The respective square bobbin 102b including the tracking coil 110 is disposed in a magnetic gap formed in a magnetic circuit not shown. By energizing the focusing and tracking coils 107 and 110 with a suitable electric current, the objective lens 101 can be driven in the directions of the arrow F and T.

The pickup system having the above-described construction further has a printed circuit substrate for supplying a driving electric current for the focusing and tracking coils 107 and 110. The printed circuit substrate is mounted on the base member 106. The focusing and tracking coils 107 and 110 are connected to the printed circuit substrate through lead wires. However, the lead wires often resonate with respect to a driving frequency of the objective lens 101 to thereby break the lead wires.

SUMMARY OF THE INVENTION

It is therefore an object of the present invention to eliminate the drawback in the prior art pickup system.

It is another object of the present invention to provide a pickup system which can prevent resonance from occurring in lead wires.

The pickup system according to the present invention includes an objective lens for irradiating a recording surface of a recording medium with a spotlight. A supporting mechanism includes a base member and it supports the objective lens so as to make the objective lens movable in the direction of the optical axis of the objective lens as well as in the direction perpendicular to the optical axis. The supporting mechanism is so designed as to align the optical axis of the objective lens to be substantially perpendicular to the recording surface. Driving force application means apply driving force to the objective lens. The driving force application means have a first coil wound so as to make its center axis substantially parallel to the direction of the optical axis, a second coil wound so as to make its center axis perpendicular to the direction of the optical axis, a printed circuit substrate attached to the base member to apply a driving current to each of the first and second coils, and a magnetic circuit for generating magnetic flux which interlinks with the first and second coils. The first and second coils are connected to the printed circuit substrate through lead wires connected to a vibration-proof material stuck to the base member.

The foregoing and other objects of the present invention will become apparent from the following description of the preferred embodiment taken in conjunction with the accompanying drawings.

DESCRIPTION OF THE PREFERRED EMBODIMENT

Referring to the drawings, an embodiment of the pickup system according to the present invention will be described hereunder.

Figure 1:
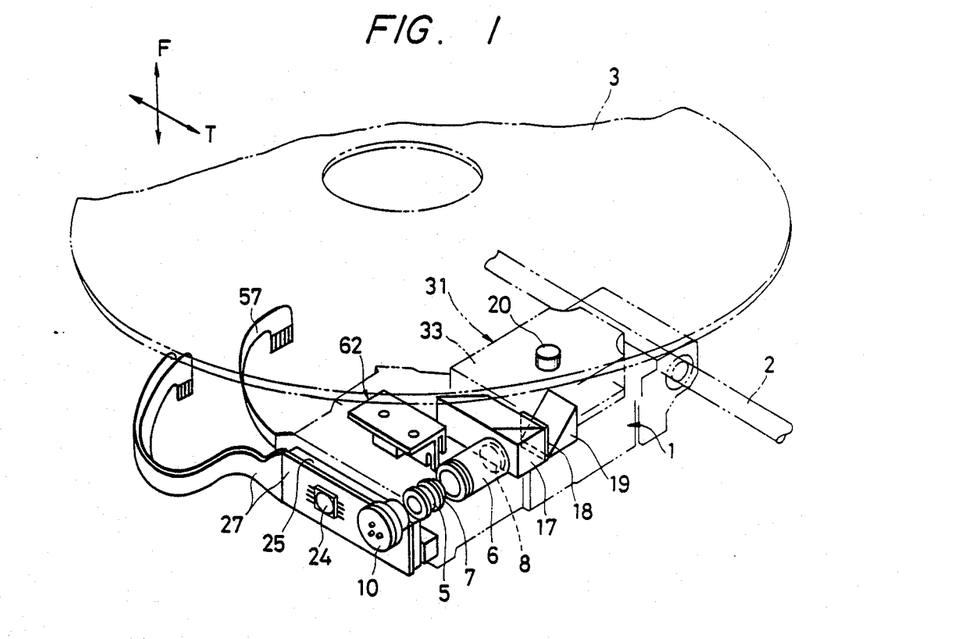
FIG. 1 is a perspective view of a pickup system according to the present invention.

Referring to FIG. 1, there is shown a pickup system having a pickup body 1 acting as a support member. The pickup body 1 is formed of aluminum or an aluminum alloy and is supported by a guide shaft 2 or the like so as to be movable along the recording surface of a disk 3. Driving means, not shown, drive the pickup body 1 along the guide shaft 2.

Figure 2:
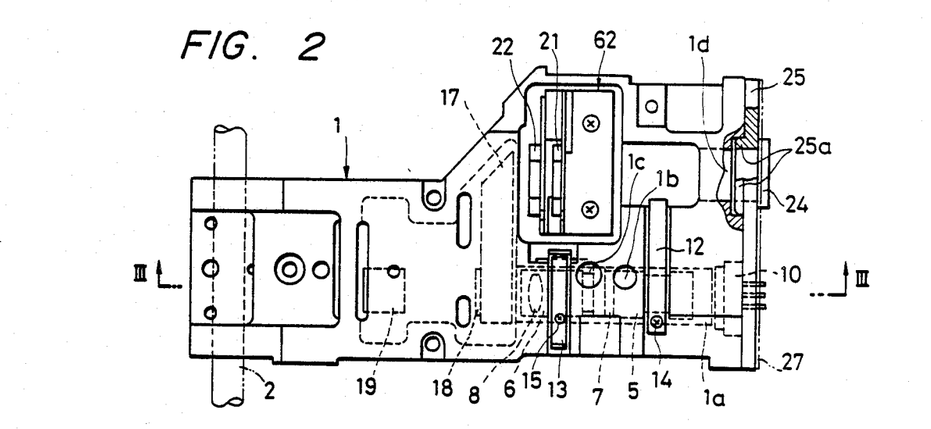
FIGS. 2 to 9 are partial detailed views of the pickup system.
Figure 3:
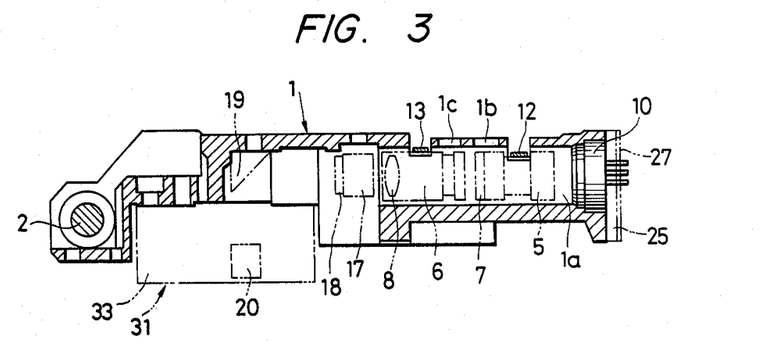

Referring to FIGS. 2 and 3, the pickup body 1 is provided with a holder insertion hole 1a (see FIG. 3) in which a first and a second cylindrical holder 5 and 6 are inserted. Each of the holders 5 and 6 is movable along its center axis and rotatable around its center axis. A grating 7 is fixed to one end of the first holder 5. A diverging lens 8 is fitted in the second holder 6. The opening end of the holder insertion hole 1a forms a spot facing portion in which a laser diode 10, acting as a light-emitting element, is fitted. The grating 7 separates the light emitted from the laser diode 10 into two types of light, that is, light for a regenerative RF signal as well as a focusing servo and light for tracking servo. The diverging lens 8 has the function of spreading the thus separated two types of light.

As shown in FIGS. 2 and 3, two rectangular plate-like leaf springs 12 and 13 are attached to the bottom of the pickup body 1 with screws 14 and 15 and abut on the outer peripheries of the respective holders 5 and 6 at their main exterior surfaces. The holders 5 and 6 are fixed to the pickup body 1 by the leaf springs 12 and 13 and by screws 14 and 15. The leaf springs and screws are generically referred to as a fixation mechanism. Tool insertion holes 1b and 1c, which are used for inserting tools (not shown) for position control of the holders 5 and 6, are provided at the bottom of the pickup body 1 at locations corresponding to the holders 5 and 6.

On the opposite side of the diverging lens 8 from the grating 7, a beam splitter 17, a quarter wave plate 18 and a total internal reflection prism 19 are arranged in the stated order and are fixed to the pickup body 1 with an adhesive agent. The quarter wave plate 18 is stuck to the beam splitter 17. An objective lens 20 which directs a spotlight onto the recording surface of the disk 3 is disposed above the total internal reflection prism 19. A pair of cylindrical lenses 21 and 22 are provided at the side of the diverging lens 8.

A light-receiving element 24 is disposed at the side of the laser diode 10 and is attached to the end surface of the pickup body 1 through a resin plate-like member 25. The cylindrical lenses 21 and 22, together with the light-receiving element 24, operate to obtain a focusing error signal. The plate-like member 25 is made of thermoplastic resin and positions the light-receiving element 24 relative to the pickup body 1. As apparent in FIG. 2, the pickup body 1 is provided with a light-hole 1d formed between the cylindrical lenses 21 and on one side and the light-receiving element 24 on the other side. An engaging portion 25a provided in the resin plate-like member 25 is fitted in a spot facing portion (not designated by a reference numeral) formed in the opening end of the light-hole 1d. The engaging portion 25a has the function of positioning the plate-like member 25 relative to the pickup body 1.

As apparent in FIG. 1, a flexible printed circuit substrate 27 is stuck onto the resin plate-like member 25 in order to transmit an electric signal generated from the light-receiving element 24 corresponding to the light-receiving condition into a control portion (not shown) provided at a fixed location in a player body which encloses the pickup system.

Figure 4:
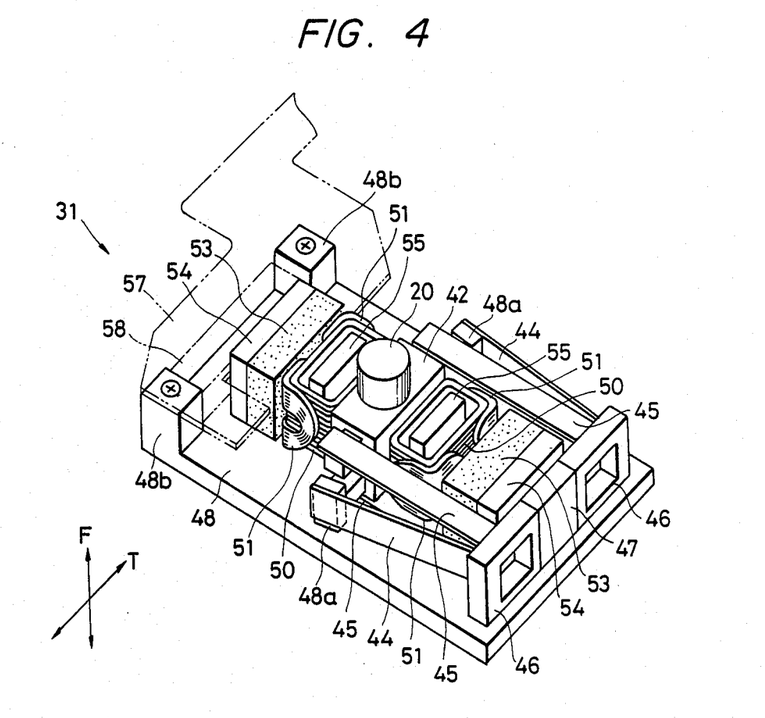
Figure 5:
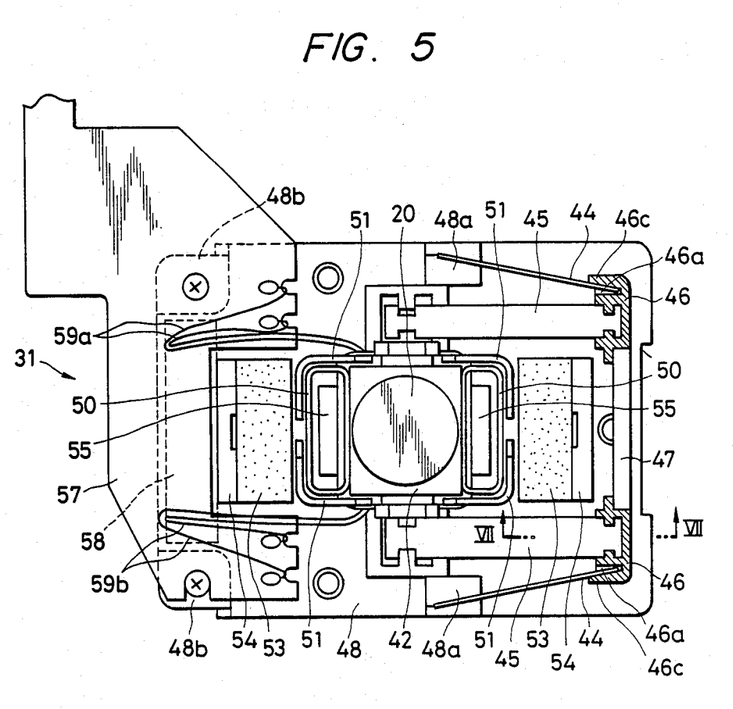

As shown in FIGS. 1 to 3, a servo mechanism 31, which is used for servo-driving the objective lens 20, is provided at an upper portion of the pickup body 1. The servo mechanism 31 is shown in detail in FIGS. 4 and 5. FIGS. 4 and 5 show elements constituting the servo mechanism in the condition that a cover member 33 shown in FIGS. 1 to 3 is removed.

As shown in FIGS. 4 and 5, the objective lens 20 is inserted into a holder 42 in the form of a rectangular parallelpiped. As further shown in FIG. 6, the holder 42 is attached to a base member 48 through six leaf springs (two horizontally flexing leaf springs 44 and four vertically flexing leaf springs 45) and a pair of junction members 46 are connected to each other through a vibration-proofing material 47 made of rubber or the like. As described above, the objective lens 20 has the function of converging the light emitted from the laser diode 10 into a fine spotlight on the recording surface of the information recording disk 3 which is a recording medium.

Of the six leaf springs, the two horizontally flexing springs 44 are arranged so as to extend along a direction substantially perpendicular to a plane containing the focusing direction F along the optical axis of the objective lens 20 and the tracking direction T perpendicular to the focusing direction. The two horizontally flexing springs are separated from each other in the tracking direction T. As shown in perspective in FIG. 4 and in plan view in FIG. 5, the horizontally flexing leaf springs 44 are attached to supporting projections 48a of the base member 48 in the form of cantilevers so as to flex in the tracking direction T. The other four leaf springs 45 are arranged so as to extend substantially in parallel to the leaf springs 44, and so as to be pair-wise separated in the focusing direction F. Portions at one end of the four vertically flexing leaf springs 45 are connected to free end portions of the two leaf springs 44 through the junction members 46. The four leaf springs 45 are flexible in the focusing direction F and support the holder 42 at their other end portions. As is particularly apparent in FIG. 6, the holder 42 is provided with two pairs of projections 42a extending oppositely in the tracking direction T and the other end portions of the four vertically flexing leaf springs 45 are connected to the projections 42a.

The holder 42, the leaf springs 44 and 45, the junction members 46, and the base member 48 make up a supporting mechanism which supports the objective lens 20 to make the objective lens movable both in the focusing direction F and in the tracking direction T and make the optical axis of the objective lens perpendicular to the recording surface of the disk.

As shown in FIGS. 4 and 5, the holder 42 is formed like a rectangular parallelpiped having six surfaces. A pair of rectangular, tubularly wound coils 50 are mounted on the two of the surfaces parallel to both the focusing direction F and the tracking direction T to make the respective center axes of the coils 50 parallel to the focusing direction F. Four coils 51 are fixed onto each of the opposite outer surfaces of the coils 50 perpendicular to the focusing direction F. The four coils 51 are located within a vertical range of the outer dimension of the two coils 50 in the focusing direction F.

Two magnetic circuits, each constituted by a magnet 53, a yoke 54 and a yoke plate 55, are provided on the base member 48 to generate magnetic flux, each of which interlinks with the coils 50 and the coils 51. The respective yoke 54 and yoke plate 55 are formed integrally with the base member 48. The respective yoke plate 55 is inserted into a corresponding one of the rectangularly wound coils 50.

These coils 50 and 51 and magnetic circuits make up driving force application means for applying driving force to the objective lens 20. Further, the driving force application means and the supporting mechanism (constituted by the leaf springs 44, 45 and so on) make up a servo mechanism for servo-driving the objective lens 20.

As shown in FIGS. 4 and 5, a pair of projections 48b are formed at the end of the base member 48. A printed circuit substrate 57 for energizing the coils 50 and 51 with driving current is fixed to the projections 48b with screws. The printed circuit substrate 57 is partly shown in FIG. 1. Polyurethane foam 58, which is used as a vibration-absorbing material and has a shape like a rectangular parallelepiped, is disposed under the printed circuit substrate 57 and is fixed to the base member 48. The vibration-absorbinh material has slits on the side surface and lead wires 59a and 59b are led in the slit. As shown in FIG. 5, the lead wires 59a and 59b are provided to connect the coils 50 and 51 to the printed circuit substrate 57, and the lead wires 59a and 59b are fixed to the polyurethane foam 58 at middle points of the lead wires 59a and 59b.

The printed circuit substrate 57 contains a conventional servo-circuit which processes electrical signals from the light receiving element 24 receiving light through the opposed cylinder lens 21 and 22. This light has been reflected from the recording surface of the disc through the objective lens 20 and split and reflected by the beam splitter 17 to the cylindrical lenses 21 and 22.

Figure 6:
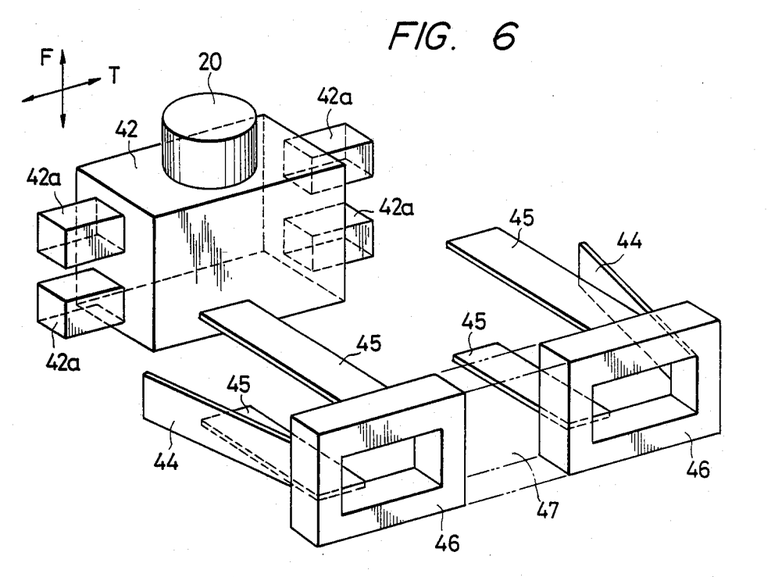
Figure 7:
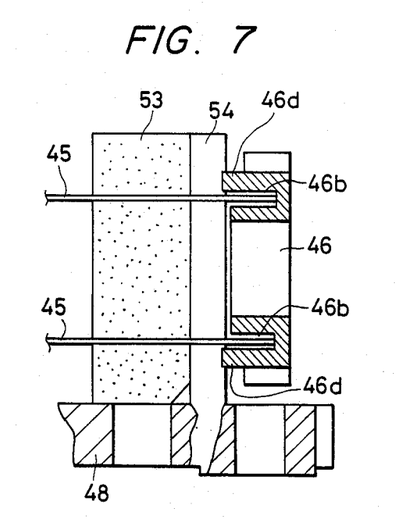

As shown in FIGS. 5 to 7, the end portions of the leaf springs 44 and 45 are put in setting slots 46a and 46b formed in the junction members 46 connecting the leaf springs 44 and 45 and are connected to the junction members 46 with an adhesive agent. The junction members 46 are provided with guide portions 46c and 46d at the edges of the setting slots 46a and 46b which guide the end portions of the leaf springs 44 and 45 into the setting slots.

As shown in FIGS. 1 and 2, the cylindrical lenses 21 and 22 are held by a holding mechanism 62. The holding mechanism 62 is shown in detail in FIG. 8. The holding mechanism 62 holds the cylindrical lenses 21 and 22 to control the position of the cylindrical lenses 21 and 22 in the direction perpendicular to the optical axis Lb of light passing through the cylindrical lenses (that is, reflected light from the recording surface of the disk 3).

Figure 8:
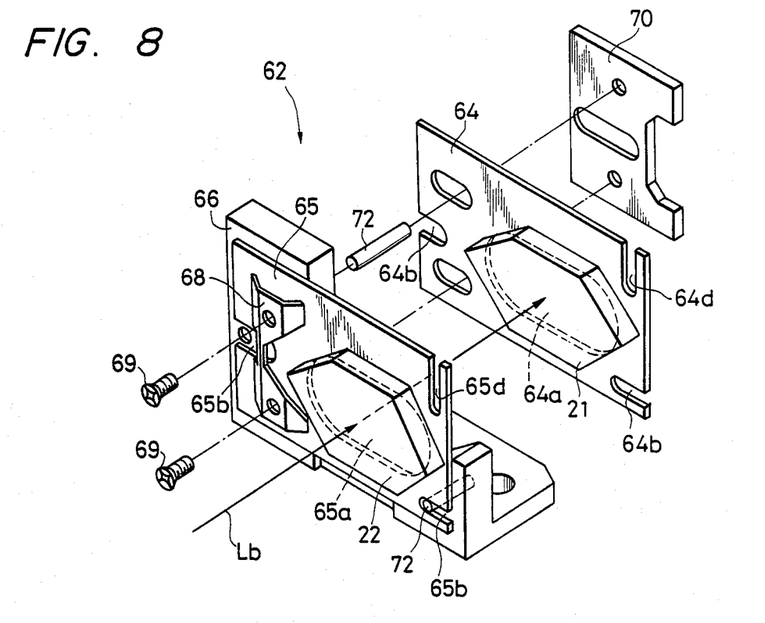

As apparent in FIG. 8, the pair of cylindrical lenses 21 and 22 are fixed to respective rectangular holders 64 and 65. The holders 64 and 65 are provided with respective light-holes 64a and 65a. The holders 64 and 65 abut on the main surfaces of the holder base 66 which is screwed on the pickup body 1 (see FIG. 1, etc.). The holders 64 and 65 are clamped by clamping means constituted by an energizing spring 68, two screws 69, and a tapped plate 70, in the direction so that the holders 64 and 65 approach the main opposed surfaces of the holder base 66. Two pins 72 parallel to the optical axis Lb of the reflecting light are fitted into holes through the holder base 66. The ends of the pins 72 extend from the main surfaces of the holder base 66 over a predetermined length. On the other hand, the holders 64 and 65 are provided with pairs of slots 64b and 65b extending in the direction perpendicular to the optical axis Lb, that is, in this case, in the lateral dirction of the holders 64 and 65. The pins 72 slidably and movably engage the pairs of guide slots 64b and 65b.

The cylindrical lenses 21 and 22 are fixed to the holders 64 and 65 to make an angle of 90 degrees between their center axes and a respective angle magnitude of about 45 degrees between the respective center axes of the two cylindrical lenses 21 and 22 and the movement direction of the holders 64 and 65 along the slots 64b and 65b. While the cylindrical lenses 21 and 22 are, of course, lenses formed by cutting out partial cylinders, the term "center axes of cylindrical lenses", used herein, means the center axes of the original cylinders. Since the center axes of the cylindrical lenses 21 and 22 are inclined by about 45 degrees relative to the movement direction of the holders 64 and 65, the moved distance of the respective cylindrical lens in the direction substantially perpendicular to the center axis becomes $\frac{1}{2}$ times the moved distance of the corresponding holder 64 or 65. In short, the focusing sensitivity in positional control of the cylindrical lenses becomes low. Accordingly, control becomes easy. By the positional control of the cylindrical lenses 21 and 22 in the direction perpendicular to the optical axis Lb of the reflecting light, the center of the light-receiving surface of the light-receiving element 24 can be made to agree with the optical axis Lb.

Figure 9:
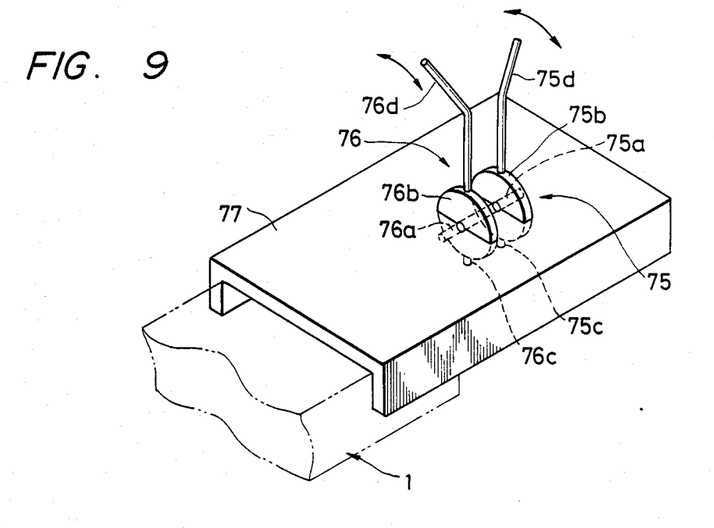

FIG. 9 shows cylindrical lens positioned control tools 75 and 76 for performing position control of the cylindrical lenses 21 and 22. As shown in FIG. 9, the tools 75 and 76 have spoked disc portions 75b and 76b rotatably and demountably attached to a stationary tool 77 through pins 75a and 76a. The stationary tool 77 is fixed with respect to the pickup body 1, that is, with respect to the holder base 66 (shown in FIG. 8). The spoked disc portions 75b and 76b have spokes 75c and 76c at their rotatable lower ends which engage with notches 64d and 65d formed in the upper end portions of the holders 64 and 65 shown in FIG. 8. Furthermore, the spoked disc portions 75b and 76b have handles 75d and 76d at their upper rotatable ends. The handles 75d and 76d can be grasped by fingers so as to be operated or turned to thereby move the holders relative to the holder base 66 and accordingly perform positional control for the cylindrical lenses 21 and 22.

In this pickup system, the coils 50 and 51 are energized with a driving current to generate driving force, and correspondingly, the leaf springs 44 and 45 suitably bent to thereby move the objective lens 20 in the tracking direction T and in the focusing direction F.

As described above, the pickup system according to the present invention comprises: an objective lens (20) for irradiating a recording surface of a recording medium (3) with a spotlight; a supporting mechanism including a base member (48) and supporting the objective lens so as to make the objective lens movable in the direction of the optical axis of the objective lens as well as in the direction perpendicular to the first-mentioned direction, and so as to make the optical axis of the objective lens substantially perpendicular to the recording surface; and driving force application means for applying driving forceto the objective lens, the driving force application means having a first coil (50) wound so as to make its center axis substantially parallel to the direction of the optical axis, a second coil (51) wound so as to make its center axis perpendicular to the direction of the optical axis, a printed circuit substrate (57) attached to the base member to apply a driving current to each of the first and second coils, and a magnetic circuit for generating magnetic flux which interlinks with the first and second coils, the first and second coils being connected to the printed circuit substrate through lead wires (59a, 59b) connected to a vibration-proof material (polyurethane foam 58) stuck to the base member.

Accordingly, it is possible to prevent resonance from occurring in the lead wires, so that there is no possibility of breaking the lead wires.

What is claimed is:

1. In an optical information recording and reproducing apparatus including a pickup system, said pick up system comprising:

an objective lens for irradiating a recording surface of a recording medium with a spotlight;

a supporting mechanism including a base member and means for supporting said objective lens for movement in the direction of an optical axis of the objective lens as well as in a direction perpendicular to said optical axis and aligning said optical axis of said objective lens substantially perpendicular to said recording surface;

the improvement comprising:

a vibration absorbing material fixed to said base member;

driving force application means for applying a position driving force to said objective lens, said driving force application means having a first coil fixed to said objective lens and wound so as to make its center axis substantially parallel to said direction of said optical axis, a second coil fixed to said objective lens and wound so as to make its center axis perpendicular to said direction of said optical axis, a printed circuit substrate attached to said base member and operatively connected to said first and second coils to supply a driving current to each of said first and second coils, a magnetic circuit for generating magnetic flux which interlinks with said first and second coils, lead wires connecting said printed circuit substrate to said first and second coils and being connected at intermediate points thereof to said vibration absorbing material, and wherein said objective lens supporting means comprises a lens holder including aligned projections to opposite sides of the objective lens, a pair of horizontally flexing leaf springs cantilever mounted to said base and having free ends extending, in a direction away from said objective lens, a pair of vertically flexing leaf springs on each side of said lens holder and being cantilever mounted to the top and bottom of said holder projections and having free ends extending parallel to each other to opposite sides of said lens and in a direction away from said objective lens, and a junction member to each side of the objective lens connected to the free ends respectively, of a pair of horizontally vertically flexing leaf springs and the adjacent horizontally flexing leaf springs, and a member of vibration proofing material spanning laterally between said junction members and connecting said junction members together such that the two horizontally flexing leaf springs extend along a direction substantially perpendicular to a plane containing the optical axis of the objective lens in a tracking direction perpendicular to the focusing direction, and wherein the two horizontal flexing springs are separated from each other in that tracking direction to permit substantial freedom of movement of the objective lens in the focusing direction and tracking direction upon energization of said first and second coils with the load of such movement would be adverse to the lead wires connecting the printed circuit substrate to the first and second coils absent their intermediate point connection to said vibration absorbing material.

2. The optical information recording and reproducing apparatus as recited in claim 1, wherein said vibration absorbing material comprises polyurethane foam.

3. The optical information recording and reproducing apparatus as claimed in claim 1, wherein said junction members comprise leaf spring setting slots for receiving the free ends of said horizontal flexing leaf spring and said pair of vertically flexing leaf springs to each side of said optical lens holder, and wherein said junction members further comprise guide portions at the edges of said setting slots which guide the ends of said leaf springs into respective setting slots.

* * * * *

UNITED STATES PATENT AND TRADEMARK OFFICE
CERTIFICATE OF CORRECTION

PATENT NO. : 4,794,580

DATED : Dec. 27, 1988

INVENTOR(S) : Ikedo et al.

It is certified that error appears in the above-identified patent and that said Letters Patent is hereby corrected as shown below:

Title page:

item [75], should read:

Inventors: Ikuya Kikuchi; Seiichi Makimoto; Akihiro Ogata; Masaru Sekine; Yasumitsu Wada; all of Saitama, Japan.

item [19], should read:
Kikuchi et al.

item [30], should read:

Foreign Application Priority Date

Aug. 23, 1985 [JP]   Japan........................ 60-128601[U]

Signed and Sealed this

Eighth Day of August, 1989

Attest:

DONALD J. QUIGG

Attesting Officer

Commissioner of Patents and Trademarks